US008693950B2

(12) United States Patent
Desai

(10) Patent No.: US 8,693,950 B2
(45) Date of Patent: Apr. 8, 2014

(54) METHOD AND SYSTEM FOR TRANSMIT POWER CONTROL TECHNIQUES TO REDUCE MUTUAL INTERFERENCE BETWEEN COEXISTENT WIRELESS NETWORKS DEVICE

(75) Inventor: Prasanna Desai, Encinitas, CA (US)

(73) Assignee: Broadcom Corporation, Irvine, CA (US)

( * ) Notice: Subject to any disclaimer, the term of this patent is extended or adjusted under 35 U.S.C. 154(b) by 1157 days.

(21) Appl. No.: 11/387,541

(22) Filed: Mar. 23, 2006

(65) Prior Publication Data

US 2007/0224936 A1   Sep. 27, 2007

(51) Int. Cl.
*H04B 7/00* (2006.01)

(52) U.S. Cl.
USPC ........ 455/41.2; 455/552.1; 455/63.1; 455/88; 370/337

(58) Field of Classification Search
USPC .......... 455/41.2, 522, 41.1, 41.3, 552.1, 63.1, 455/88; 370/337
See application file for complete search history.

(56) References Cited

U.S. PATENT DOCUMENTS

| 6,895,255 | B1 * | 5/2005 | Bridgelall ................... 455/552.1 |
| 7,454,171 | B2 * | 11/2008 | Palin et al. ................... 455/41.2 |
| 7,486,932 | B2 * | 2/2009 | Palin et al. ................... 455/41.2 |
| 7,701,913 | B2 * | 4/2010 | Chen et al. ..................... 370/338 |
| 8,094,631 | B2 * | 1/2012 | Banerjea et al. ............. 370/338 |
| 8,116,684 | B2 * | 2/2012 | Gao et al. ..................... 455/41.2 |
| 2001/0051530 | A1 | 12/2001 | Shiotsu et al. |
| 2004/0127216 | A1 | 7/2004 | Fukushima |
| 2007/0149150 | A1 * | 6/2007 | Miyazaki .................... 455/127.1 |
| 2007/0224935 | A1 * | 9/2007 | Waxman ....................... 455/41.2 |

FOREIGN PATENT DOCUMENTS

| EP | 1207654 A2 | 5/2002 |
| EP | 1626541 A2 | 2/2006 |
| KR | 2004 0060459 | 7/2004 |
| WO | 03061224 A1 | 7/2003 |
| WO | 03105418 A2 | 12/2003 |
| WO | 2006053951 A1 | 5/2006 |

OTHER PUBLICATIONS

Nada Golmie, Nicolas Chevrollier and Olivier Rebala, *Bluetooth and WLAN Coexistence: Challenges and Solutions*, IEEE Wireless Communications, Dec. 2003, pp. 22-29.

(Continued)

*Primary Examiner* — Nay A Maung
*Assistant Examiner* — Angelica M Perez
(74) *Attorney, Agent, or Firm* — Thomas|Horstemeyer, LLP

(57) ABSTRACT

Aspects of a method and system for transmit power control techniques to reduce mutual interference between coexistent wireless networks are provided. A coexistence terminal comprising a WLAN radio and a Bluetooth radio operating as a master device may transmit signals to one or more remote controllers comprising a slave Bluetooth radio to increase transmission power when the isolation between the coexistence terminal's WLAN and Bluetooth radios is below a threshold. Link manager protocol (LMP) signals may be utilized for changing the transmission power. When the isolation increases above the threshold, signals may be generated to reduce the remote controllers' transmission power. In some instances, in addition to increasing the transmission power of remote controllers, the transmission power of the Bluetooth radio or the WLAN radio may be reduced. The reduced Bluetooth or WLAN radio transmission power may be increased when the radio isolation in the coexistence terminal increases.

21 Claims, 8 Drawing Sheets

(56) References Cited

OTHER PUBLICATIONS

*Draft Recommended Practice for Information Technology-Telecommunications and Information Exchange Between Systems-Local and Metropolitan Area Networks Specific Requirements, Part 15.2: Coexistence of Wireless Personal Area Networks with Other Wireless Devices Operating in Unlicensed Frequency Bands*, IEEE Standards Activities Department, Standard Licensing and Contracts, IEEE P802.15.2/Draft #05, Mar. 15 2002, pp. 1-98.

Brian P. Crow, Indra Widjaja, Jeong Geun Kim, and Prescott T. Sakai, *IEEE 802.11 Wireless Local Area Networks*, IEEE Communications Magazine, Sep. 1997, pp. 116-126.

Daniel Bensky, Short-range Wireless Communication, Elsevier, Section 11.4, Dec. 24, 2003, 7 pages.

European Search Report for European Patent Application No. 06021664.5-1525, dated Aug. 26, 2010, 9 pages.

The Chinese search report in the copending relating Chinese application No. 200610166782.1, mailed Dec. 31, 2011.

* cited by examiner

METHOD AND SYSTEM FOR TRANSMIT POWER CONTROL TECHNIQUES TO REDUCE MUTUAL INTERFERENCE BETWEEN COEXISTENT WIRELESS NETWORKS DEVICE

CROSS-REFERENCE TO RELATED APPLICATIONS/INCORPORATION BY REFERENCE

This application makes reference to:
U.S. application Ser. No. 11/143,559 filed on Jun. 2, 2005; and
U.S. application Ser. No. 11/387,309 filed on even date herewith.

The above referenced applications are hereby incorporated herein by reference in their entirety.

FIELD OF THE INVENTION

Certain embodiments of the invention relate to interference in communication systems. More specifically, certain embodiments of the invention relate to a method and system for transmit power control techniques to reduce mutual interference between coexistent wireless networks.

BACKGROUND OF THE INVENTION

The use of Wireless Personal Area Networks (WPANs) has been gaining popularity in a great number of applications because of the flexibility and convenience in connectivity they provide. WPAN systems, such as those based on Class 2 Bluetooth (BT) technology, generally replace cumbersome cabling and/or wiring used to connect peripheral devices and/or mobile terminals by providing short distance wireless links that allow connectivity within a 10-meter range. Though, for a limited number of applications, higher-powered Class 1 BT devices may operate within a 100-meter range. In contrast to WPAN systems, Wireless Local Area Networks (WLANs) provide connectivity to devices that are located within a slightly larger geographical area, such as the area covered by a building or a campus, for example. WLAN systems are based on IEEE 802.11 standard specifications, typically operate within a 100-meter range, and are generally utilized to supplement the communication capacity provided by traditional wired Local Area Networks (LANs) installed in the same geographic area as the WLAN system.

In some instances, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Both Bluetooth and WLAN radio devices, such as those used in, for example, handheld wireless terminals, generally operate in the 2.4 GHz (2.4000-2.4835 GHz) Industrial, Scientific, and Medical (ISM) unlicensed band. Other radio devices, such as those used in cordless phones, may also operate in the ISM unlicensed band. While the ISM band provides a suitable low-cost solution for many of short-range wireless applications, it may also have some drawbacks when multiple users operate simultaneously. For example, because of the limited bandwidth, spectrum sharing may be necessary to accommodate multiple users. Multiple active users may also result in significant interference between operating devices. Moreover, in some instances, microwave ovens may also operate in this frequency spectrum and may produce significant interference or blocking signals that may affect Bluetooth and/or WLAN transmissions.

When operating a Bluetooth radio and a WLAN radio in, for example, a wireless device, at least two different types of interference effects may occur. First, when an interfering signal is present in a transmission medium along with the signal-of-interest, a low signal-to-noise-plus-interference ratio (SINR) may result. In this instance, for example, a Bluetooth signal may interfere with a WLAN signal or a WLAN signal may interfere with a Bluetooth signal. The second effect may occur when the Bluetooth and WLAN radio devices are collocated, that is, when they are located in close proximity to each other so that there is a small radio frequency (RF) path loss between their corresponding radio front-end receivers. In this instance, the measurable value of the isolation, that is, the RF path loss between the Bluetooth radio front-end and the WLAN radio front-end, may be as low as 10 dB, for example. As a result, one radio may desensitize the front-end of the other radio upon transmission. Moreover, since Bluetooth employs transmit power control, the collocated Bluetooth radio may step up its power level when the signal-to-noise ratio (SNR) on the Bluetooth link is low, effectively compromising the front-end isolation between radio devices even further. Low noise amplifiers (LNAs) in the radio front-ends may not be preceded by a channel selection filter and may be easily saturated by the signals in the ISM band, such as those from collocated transmissions. The saturation may result in a reduction in sensitivity or desensitization of the receiver portion of a radio front-end, which may reduce the radio front-end's ability to detect and demodulate the desired signal.

Packet communication in WLAN systems requires acknowledgement from the receiver in order for the communication to proceed. When the isolation between collocated radio devices is low, collisions between WLAN communication and Bluetooth communication, due to greater levels of mutual interference than if the isolation were high, may result in a slowdown of the WLAN communication, as the access point does not acknowledge packets. This condition may continue to spiral downwards until the access point drops the WLAN station. If, in order to avoid this condition, WLAN communication in collocated radio devices is given priority over all Bluetooth communication, then isochronous Bluetooth packet traffic, which does not have retransmission capabilities, may be starved of communication bandwidth. Moreover, this approach may also starve other Bluetooth packet traffic of any communication access. Collocated WLAN/Bluetooth radio devices should therefore be operated so as to maintain WLAN communication rates high while also providing access to Bluetooth communication when necessary.

Different techniques have been developed to address the low isolation problem that occurs between collocated Bluetooth and WLAN radio devices in coexistent operation. These techniques may take advantage of either frequency and/or time orthogonality mechanisms to reduce interference between collocated radio devices. Moreover, these techniques may result from so-called collaborative or non-collaborative mechanisms in Bluetooth and WLAN radio devices, where collaboration refers to any direct communication between the protocols. For example, Bluetooth technology utilizes Adaptive Frequency Hopping (AFH) as a frequency division multiplexing (FDM) technique that minimizes channel interference. In AFH, the physical channel is characterized by a pseudo-random hopping, at a rate of 1600 hops-per-second, between 79 1 MHz channels in the Bluetooth piconet. AFH provides a non-collaborative mechanism that may be utilized by a Bluetooth device to avoid frequencies occupied by a spread spectrum system such as a WLAN system. In some instances, the Bluetooth radio may be adapted to modify its hopping pattern based on, for example, frequencies in the ISM spectrum that are not being occupied by other users.

Even when frequency division multiplexing techniques are applied, significant interference may still occur because a strong signal in a separate channel may still act as a blocking signal and may desensitize the radio front-end receiver, that is, increase the receiver's noise floor to the point that the received signal may not be clearly detected. For example, a collocated WLAN radio front-end transmitter generating a 15 dBm signal acts as a strong interferer or blocker to a collocated Bluetooth radio device receiver when the isolation between radio devices is only 10 dB. Similarly, when a Bluetooth radio device is transmitting and a WLAN radio device is receiving, particularly when the Bluetooth radio front-end transmitter is operating as a 20 dBm Class 1 type, the WLAN radio device receiver may be desensed by the Bluetooth transmission as the isolation between radios is reduced.

Other techniques may be based on collaborative coexistence mechanisms, such as those described in the IEEE 802.15.2—2003 Recommended Practice for Information Technology—Part 15.2: Coexistence of Wireless Personal Area Networks with Other Wireless Devices Operating in the Unlicensed Frequency Bands. For example, these techniques may comprise Medium Access Control (MAC) layer mechanisms or Physical (PHY) layer mechanisms. The MAC layer techniques may comprise, for example, the Alternating Wireless Medium Access (AWMA) technique or the Packet Traffic Arbitration (PTA) technique. Both the AWMA and the PTA techniques provide a time division multiplexing (TDM) approach to the collocated radio device isolation problem. For example, the AWMA technique partitions a WLAN communication interval into two segments: one for the WLAN system and one for the WPAN system. Each wireless system is then restricted to transmissions in their allocated time segments. On the other hand, the PTA technique provides for each communication attempt by either a collocated WLAN radio device or a Bluetooth radio device to be submitted for arbitration and approval. The PTA may then deny a communication request that would result in collision or interference. The PHY layer technique may comprise, for example, a programmable notch filter in the WLAN radio device receiver to filter out narrow-band WPAN or Bluetooth interfering signals. These techniques may result in some transmission inefficiencies or in the need of additional hardware features in order to achieve better coexistent operation. In instances where usage models for WLAN and Bluetooth involve high QoS or low latency applications and/or high bandwidth traffic, the use of time-multiplexed packet arbitration techniques, such as collaborative coexistence mechanisms, may not be available.

Increasing the radio isolation, that is, the RF path loss between radio front-ends in closely placed WLAN and Bluetooth radios may be achieved by utilizing separate antennas or antenna arrays for each protocol supported by a coexistence device. In this regard, various antenna techniques, such as building passive or active cancellers, and/or polarization, for example, may be utilized to reduce and/or eliminate signal interference. However, antenna techniques may be costly and, in some instances, unproven for a particular product and/or usage model.

Reducing the transmission power of the WLAN radio may, in some instances, result in reduced interference effects. However, this approach may also result in a hidden node problem where distant WLAN stations or access point nodes may be unaware of the coexistence terminal presence. Similarly, reducing the coexistence terminal's Bluetooth radio's maximum power (MAX_PWR) to a setting lower than, for example, 4 dBm for Class 2 operation, may also result in dropped connections while communicating with peripheral devices.

Cost effective and efficient techniques and/or systems that enable WLAN and Bluetooth radios in close proximity in a coexistence terminal to support high QoS or low latency applications and/or high bandwidth traffic may be necessary in order to provide the appropriate usage models in certain applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is for transmit power control techniques to reduce mutual interference between coexistent wireless networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for transmit power control techniques to reduce mutual interference between coexistent wireless networks. A coexistence terminal comprising a WLAN radio and a Bluetooth radio operating as a master Bluetooth device may transmit signals to one or more remote controllers comprising a slave Bluetooth radio to increase transmission power when the isolation between the WLAN and master Bluetooth radios in the coexistence terminal is below a threshold. Link manager protocol (LMP) signals may be utilized for changing the transmission power. When the isolation increases above the threshold, signals may be generated to reduce the transmission power of the remote controllers. In some instances, in addition to increasing the transmission power of remote controllers, the transmission power of the Bluetooth radio or the WLAN radio may be reduced. The reduced Bluetooth or WLAN radio transmission power may be increased when the radio isolation in the coexistence terminal increases.

Figure 1A:
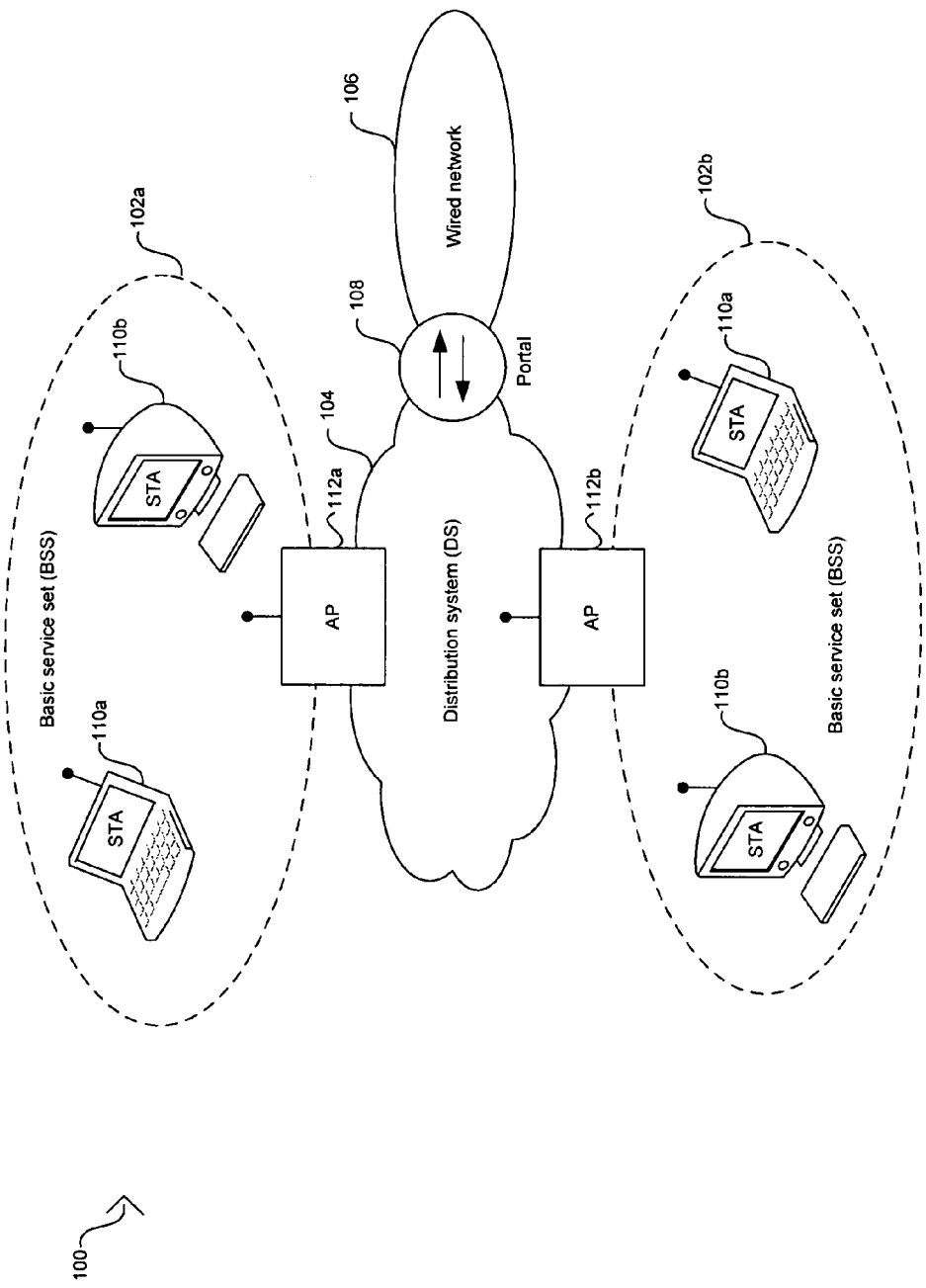
FIG. 1A is a block diagram of an exemplary WLAN infrastructure network comprising basic service sets (BSSs) integrated using a common distribution system (DS), in connection with an embodiment of the invention.

FIG. 1A is a block diagram of an exemplary WLAN infrastructure network comprising basic service sets (BSSs) integrated using a common distribution system (DS), in connection with an embodiment of the invention. Referring to FIG. 1A, the exemplary WLAN infrastructure network 100 shown may comprise a first BSS 102a, a second BSS 102b, a DS 104, a wired network 106, a portal 108, a first access point (AP) 112a, a second AP 102b, and a plurality of WLAN stations (STAs). The BSSs 102a and 102b may represent a fundamental building block of the IEEE 802.11 (WLAN) architecture and may be defined as a group of stations (STAs) that are under the direct control of a single coordination function. The geographical area covered by a BSS is known as the basic service area (BSA). The DS 104 may be utilized to integrate the BSSs 102a and 102b and may comprise suitable hardware, logic, circuitry, and/or code that may be adapted to operate as a backbone network that is responsible for Medium Access Control (MAC) level transport in the WLAN infrastructure network 100. The DS 104, as specified by the IEEE 802.11 standard, is implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 is logically different from the BSSs and may be utilized only to transfer packets between the BSSs and/or to transfer packets between the BSSs and the wired network 106.

The wired network 106 may comprise suitable hardware, logic, circuitry, and/or code that may enable providing wired networking operations. The wired network 106 may be accessed from the WLAN infrastructure network 100 via the portal 108. The portal 108 may comprise suitable hardware, logic, circuitry, and/or code that may enable integrating the WLAN infrastructure network 100 with non-IEEE 802.11 networks. Moreover, the portal 108 may also enable performing the functional operations of a bridge, such as range extension and/or translation between different frame formats, in order to integrate the WLAN infrastructure network 100 with IEEE 802.11-based networks.

The APs 112a and 112b may comprise suitable hardware, logic, circuitry, and/or code that may enable supporting range extension of the WLAN infrastructure network 100 by providing the integration points necessary for network connectivity between the BSSs. The STA 110a and the STA 110b correspond to WLAN-enabled terminals that comprise suitable hardware, logic, circuitry, and/or code that may enable providing connectivity to the WLAN infrastructure network 100 via the APs. The STA 110a shown is a laptop computer and may correspond to a mobile station or terminal within the BSS and the STA 110b shown is a desktop computer and may correspond to a fixed or stationary terminal within the BSS. Each BSS may comprise a plurality of mobile and/or fixed stations and may not be limited to the exemplary implementation shown in FIG. 1A.

Figure 1B:
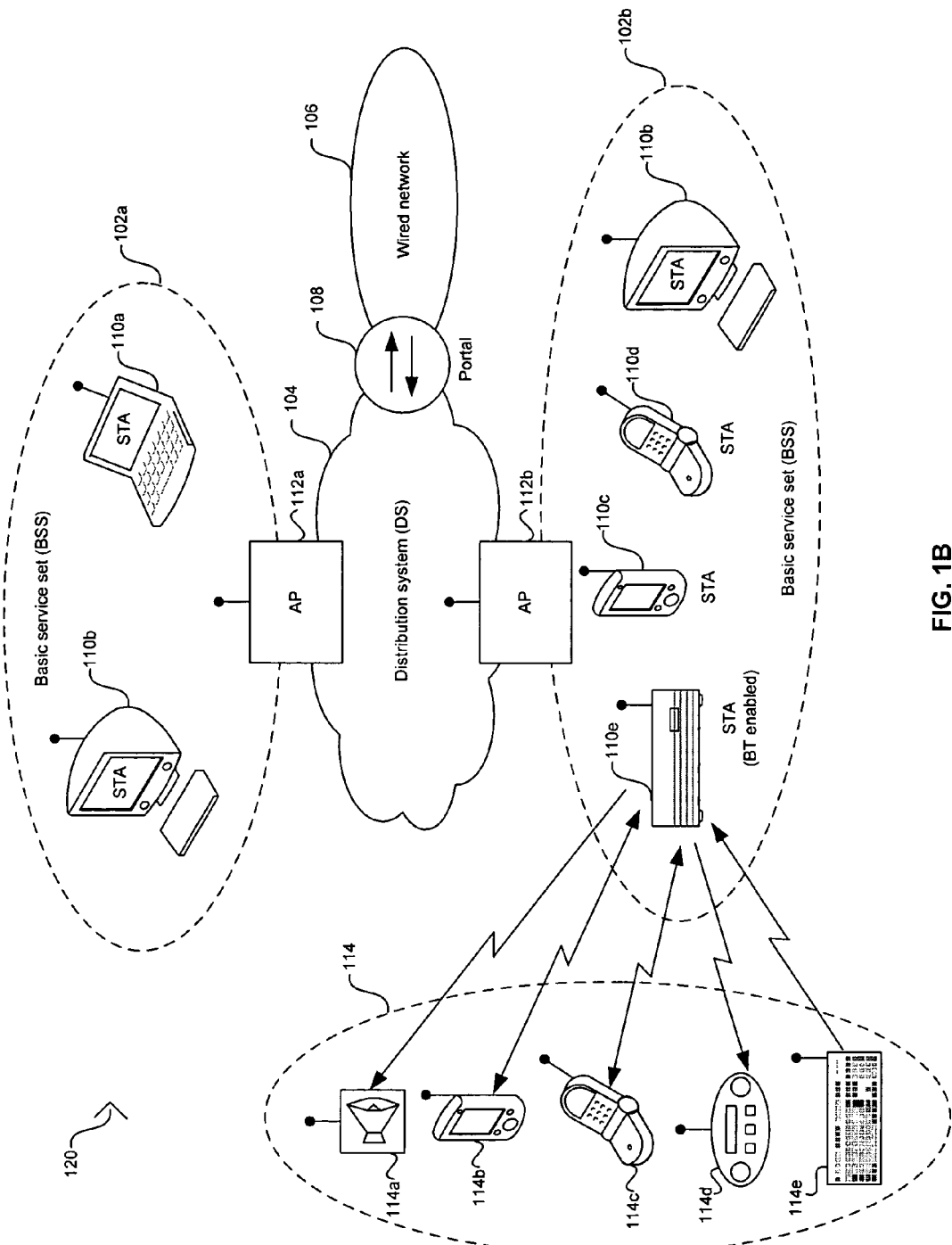
FIG. 1B is a block diagram of an exemplary WLAN infrastructure network comprising a BSS with stations that support WLAN/Bluetooth coexistence, in accordance with an embodiment of the invention.

FIG. 1B is a block diagram of an exemplary WLAN infrastructure network comprising a BSS with stations that support WLAN/Bluetooth coexistence, in accordance with an embodiment of the invention. Referring to FIG. 1B, the exemplary WLAN infrastructure network 120 shown differs from the WLAN infrastructure network 100 in FIG. 1A in that at least one BSS comprises at least one station or terminal that supports Bluetooth technology. In this regard, the second BSS 102b comprises the STA 110b, a Personal Digital Assistant (PDA) 110c, a mobile phone 110d, and a coexistence terminal 110e that is Bluetooth-enabled. In this regard, the coexistence terminal 110e may be a console that may be utilized for interactive participation with one or more users, for example. The peripheral devices 114 shown may be part of the Wireless Personal Area Network (WPAN) supported by the Bluetooth-enabled coexistence terminal 110e. For example, the coexistence terminal 110a may communicate via Bluetooth technology with a keyboard 114e, a remote controller 114d, a mobile phone 114c, a PDA 114b, and/or an audio device 114a. The audio device 114a may be a headset, headphones, or speakers, for example. When the audio device 114a is a headset, it may enable receiving and/or transmitting Continuous Variable Slope Delta (CVSD) modulated voice. The remote controller 114d may comprise suitable logic, circuitry, and/or that may enable interactive use of applications being executed by the coexistence terminal 110e, for example.

The peripheral devices 114 and the coexistence terminal 110e may form an ad-hoc Bluetooth piconet. Generally, a Bluetooth piconet may comprise a master device or terminal and up to seven slave devices or terminals. In this exemplary implementation, the coexistence terminal 110e may correspond to the master Bluetooth terminal and the peripheral devices 114 may correspond to the slave Bluetooth terminals.

The Bluetooth-enabled coexistence terminal 110e in FIG. 1B may comprise a WLAN radio device and a Bluetooth radio device that allows it to communicate with the WLAN infrastructure network 100 via the AP 112b and with the Bluetooth piconet respectively. Due to the size of the coexistence terminal 110e, locating the WLAN and BT radio devices in the same terminal may result in signal interference between WLAN and BT communications. Similarly, when the PDA 110c and/or the mobile phone 110d are Bluetooth-enabled, the small form factor of these coexistence terminals may result in a small radio frequency (RF) path loss between WLAN and BT radio devices and likely interference between WLAN and BT communications.

Figure 1C:
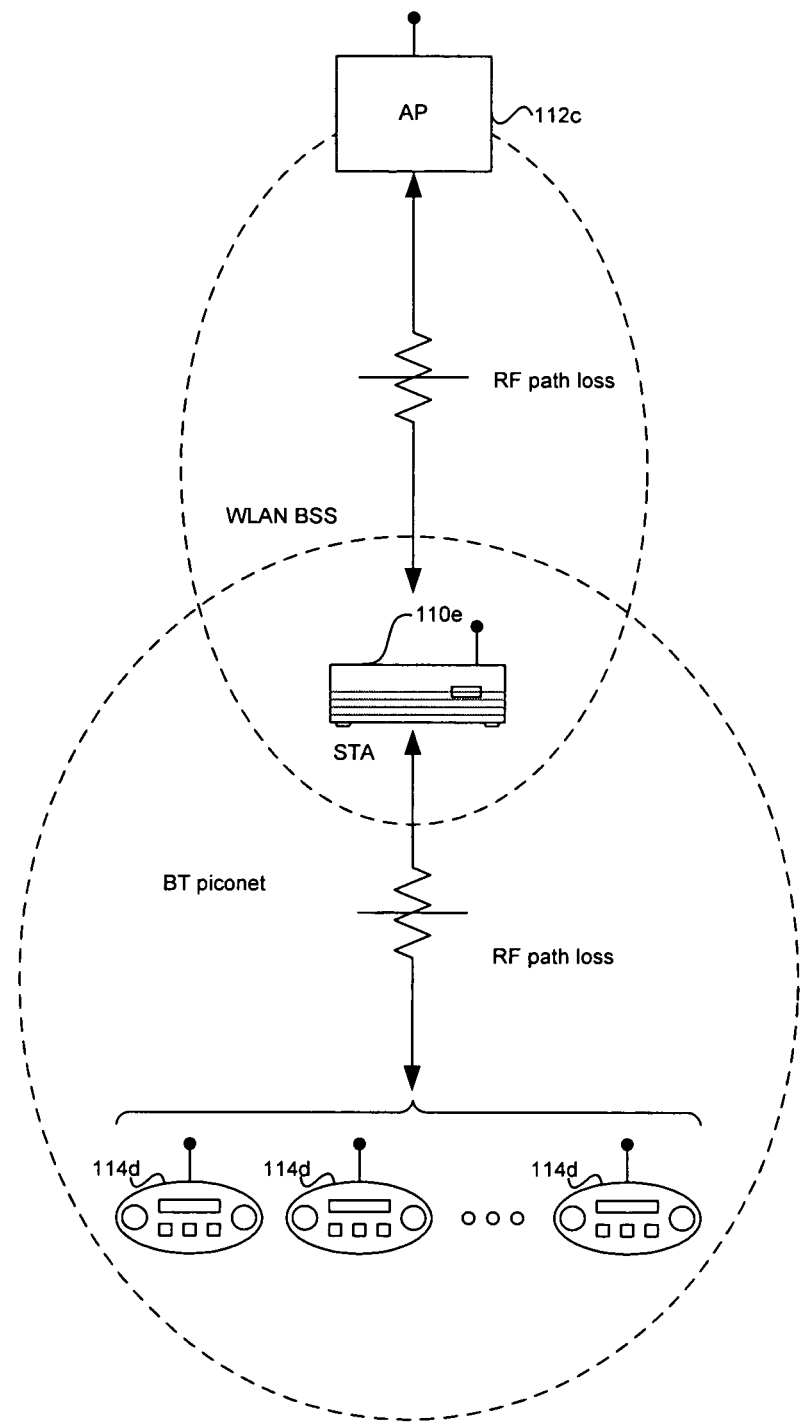
FIG. 1C is a block diagram that illustrates an exemplary usage model for a coexistence terminal with WLAN and Bluetooth radio devices, in accordance with an embodiment of the invention.

FIG. 1C is a block diagram that illustrates an exemplary usage model for a coexistence terminal with collocated WLAN and Bluetooth radio devices, in accordance with an embodiment of the invention. Referring to FIG. 1C, the Bluetooth-enabled coexistence terminal 110e may comprise a WLAN radio device to communicate with the AP 112c. The RF path loss between the AP 112c and the coexistence terminal 110e may be, for example, 65 dB for 10 meters. The IEEE 802.15.2 draft, for example, provides a formula for calculating the RF path loss. The coexistence terminal 110e may also comprise a Bluetooth radio device to communicate with, for example, a plurality of Bluetooth-enabled remote controllers 114d, for example. Because of the small form factor of the coexistence terminal 110e, the WLAN and Bluetooth radio devices may be in such close proximity to each other within the same terminal that the isolation between them is sufficiently low to allow desensitization of one radio device by the other.

The coexistence terminal 110e may comprise two transmission power levels. For example, the coexistence terminal 110e may operate as a Class 1 power level terminal with a maximum transmission power of 20 dBm to communicate with any of the remote controllers 114d. In another example, the coexistence terminal 110e may operate as a Class 2 power level terminal with a maximum transmission power of 4 dBm to communicate with any of the remote controllers 114d. The coexistence terminal 110e may correspond to a master Bluetooth device while each of the remote controllers 114d shown in FIG. 1C may correspond to a slave Bluetooth device.

In operation, the coexistence terminal 110e may receive data from the WLAN infrastructure network via the AP 112c. The coexistence terminal 110e may be executing applications that may utilize the data received from the AP 112c. The coexistence terminal 110e may also receive data and/or commands from at least one of the remote controllers 114d and may utilize the received data and/or commands in the applications. In this regard, the coexistence terminal 110e enables a plurality of users, some via the Bluetooth piconet while others via the WLAN BSS, to access or interact with applications in the coexistence terminal 110e. The coexistence terminal 110e may also transfer data to any of the remote controllers 114 and/or to the AP 112c. Because WLAN and Bluetooth coexistence in this usage model may require high QoS or low latency applications and/or high bandwidth traffic, the coexistence terminal 110e may not be able to utilize time-multiplexed packet arbitration techniques, such as collaborative coexistence mechanisms, to reduce or eliminate the effects of receiver desensitization interference.

Figure 2A:
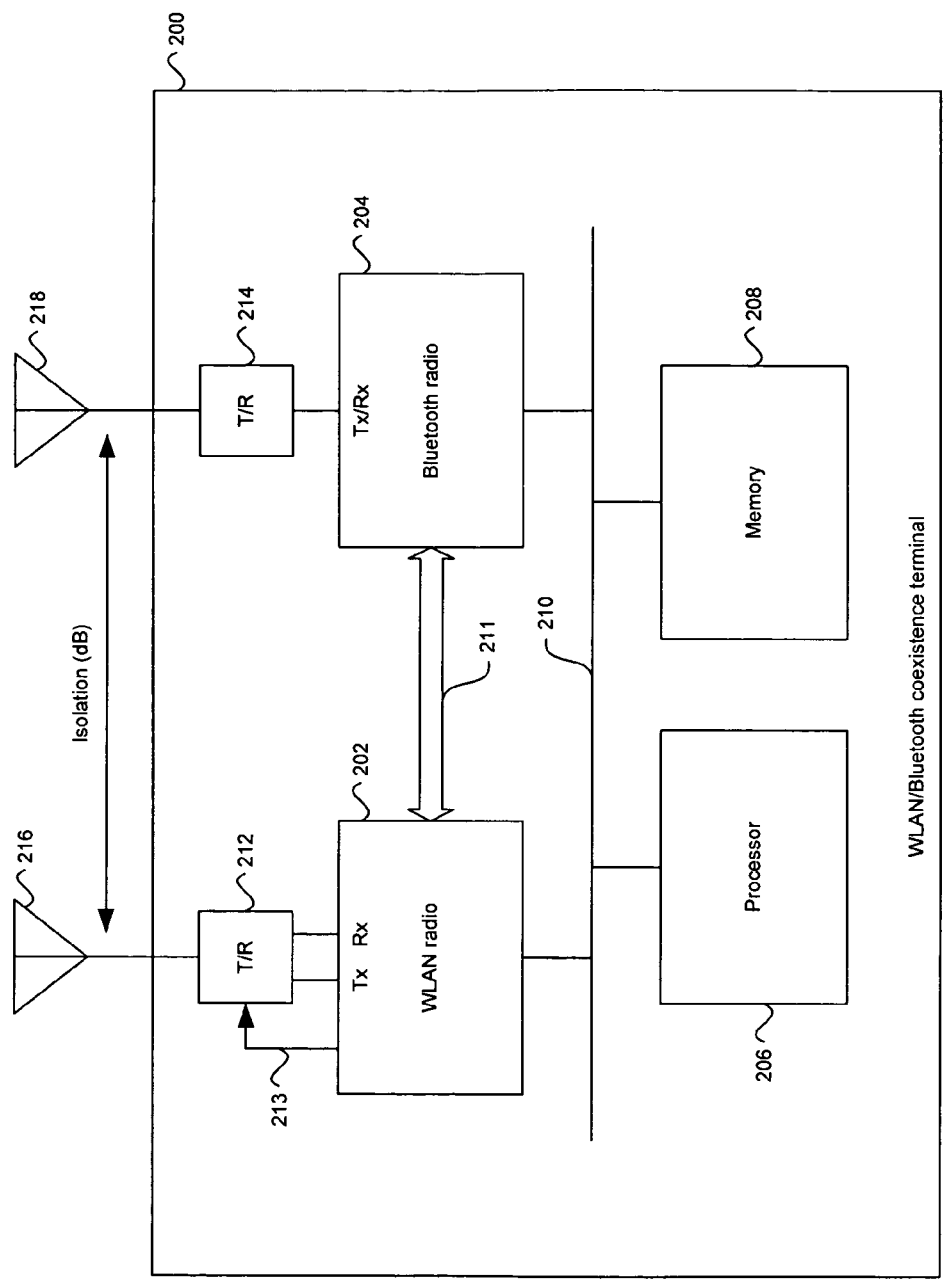
FIG. 2A is a block diagram illustrating an exemplary WLAN/Bluetooth coexistence terminal with separate WLAN and Bluetooth radio devices, in accordance with an embodiment of the invention.

FIG. 2A is a block diagram illustrating an exemplary WLAN/Bluetooth coexistence terminal with separate WLAN and Bluetooth radio devices, in accordance with an embodiment of the invention. Referring to FIG. 2A, there is shown a WLAN/Bluetooth coexistence terminal 200 that may comprise a WLAN radio 202, a Bluetooth radio 204, processor 206, a memory 208, a first transmit/receive (T/R) switch 212, a second T/R switch 214, a first antenna 216, and a second antenna 218. The measurable isolation value, that is, the RF path loss between the front-end of the Bluetooth radio 204 and the front-end of the WLAN radio 202, may be based on the current communication operations, including the current user model, and the proximity between the first antenna 216 and the second antenna 218 in the WLAN/Bluetooth coexistence terminal 200. In this regard, interference effects may occur in the WLAN/Bluetooth coexistence terminal 200 when the value of the isolation is sufficiently low.

The WLAN radio 202 may comprise suitable logic, circuitry, and/or code that may enable processing WLAN protocol packets for communication. In this regard, the WLAN radio 202 may enable receiving and/or generating data to be communicated via the WLAN protocol. Firmware operating in the WLAN radio 202 may be utilized to schedule and/or control WLAN packet communication. As shown, the WLAN radio 202 may comprise separate ports for transmission (TX) and reception (RX) of WLAN packet traffic. However, a single TX/RX port may also be utilized for WLAN communication. In some instances, the WLAN radio 202 may utilize an external power amplifier to increase transmission power.

The WLAN radio 202 may enable generating at least one control signal, such as the signal 213 to configure the operation of the first T/R switch 212. For example, the signal 213 may be utilized to configure the first T/R switch 212 to enable data communication from the Tx port in the WLAN radio 202 to the first antenna 216. Moreover, the signal 213 may also be utilized to configure the first T/R switch 212 to enable data communication from the first antenna 216 to the Rx port in the WLAN radio 202. The WLAN radio 202 may communicate with the Bluetooth radio 204, processor 206, and/or the memory 208 via the bus 210. In this regard, the bus 210 may correspond to a data and/or control bus utilized in the WLAN/Bluetooth coexistence terminal 200.

For user models where the WLAN/Bluetooth coexistence terminal 200 may utilize collaborative coexistence mechanisms, such as time-multiplexed packet arbitration techniques, to reduce interference effects, the WLAN radio 202 may be adapted to generate a WLAN transmission (TX_WLAN) signal and to assert the TX_WLAN signal during WLAN communication. The TX_WLAN signal may be one of a plurality of signals that may be communicated via the signal bus 211 shown in FIG. 2A. The WLAN radio 202 may also be enable receiving a Bluetooth priority (TX_BT) signal from the Bluetooth radio 204. The TX_BT signal may be one of a plurality of signals that may be communicated via the signal bus 211. The TX_WLAN and TX_BT signals may be referred to as priority signals, for example.

When the Bluetooth radio 204 asserts the TX_BT signal, the transmission of WLAN traffic from the WLAN radio 202 may be disabled. No polling or interrupt-driven mechanism need be utilized. In this regard, disabling the transmission path in the WLAN radio 202 may be performed by, for example, utilizing a general-purpose input/output (GPIO) pin. This approach may be similar to disabling a WLAN device in airplanes so that passengers may be sure the radios in their portable devices are turned off and cannot interfere with the airplane's systems. When the Bluetooth radio 204 deasserts the TX_BT signal, the transmission of WLAN traffic from the WLAN radio 202 may be enabled. Firmware operating in the WLAN radio 202 may track the traffic status when WLAN transmission is disabled and may utilize the traffic status to resume communications once WLAN transmission is enabled.

The Bluetooth radio 204 may comprise suitable logic, circuitry, and/or code that may enable processing Bluetooth protocol packets for communication. Firmware operating in the Bluetooth radio 204 may be utilized to schedule and/or control Bluetooth packet communication. As shown, the Bluetooth radio 204 may comprise a single port for transmission and reception (TX/RX) of Bluetooth packet traffic. The Bluetooth radio 204 may receive or transmit Bluetooth protocol packets via the second T/R switch 214 and the second antenna 218. The Bluetooth radio 204 may be operated as a master Bluetooth radio, for example, that may communicate with one or more peripheral devices operating as slave Bluetooth radios.

For user models where the WLAN/Bluetooth coexistence terminal 200 may utilize collaborative coexistence mechanisms, such as time-multiplexed packet arbitration techniques, to reduce interference effects, the Bluetooth radio 204 may enable generating the TX_BT signal and asserting the signal when Bluetooth frames are available for communication. The TX_BT signal may be communicated to the WLAN radio 202 via a GPIO pin in the Bluetooth radio 204. The Bluetooth radio 204 may also enable deasserting the TX_BT signal when communication of the Bluetooth frames has been completed.

For user models where the WLAN and Bluetooth communication involve high QoS or low latency applications and/or high bandwidth traffic, the collaborative coexistence mechanisms may be disabled and control of a portion of the operations of the WLAN radio 202 and/or Bluetooth radio 204 may be performed by the processor 206, for example. Such a user model may occur when multiple users utilize the WLAN/Bluetooth coexistence terminal 200 as an interactive console and enabling participation by a required number of users may not support the bandwidth requirements necessary to implement time-multiplexed packet arbitration techniques for reducing interference effects.

The Bluetooth radio 204 may enable communication of Bluetooth packets supported by the asynchronous connection-oriented (ACL) logical transport, such as DM1 packets, for example. The Bluetooth radio 204 may comprise a link manager that may carry out link setup, authentication, link configuration and other protocols, for example. The link manager may discover when other remote link managers are in operation in the piconet and may communicate with them via a link manager protocol (LMP). The link manager may utilize an underlying link controller to perform its service provider role. The LMP may comprise a number of protocol data units (PDUs), which may be sent from one Bluetooth-enabled device to another as single-slot packets. In this regard, DM1 packets may be utilized to transport link manager PDUs.

The DM1 packets in Bluetooth ACL logical transport may be utilized to carry data information between Bluetooth-enabled devices. The payload of a DM1 packet may comprise between 1 and 18 information bytes, including a 1-byte header, and a 16-bit CRC code. The DM1 packet may occupy a single Bluetooth time slot. The information and CRC in the payload may be coded at a 2/3 forward error correction (FEC) rate, for example. A length indicator in the payload header may specify the number of user bytes, excluding the payload header and CRC code. The DM1 packet may be utilized to support control messages in any logical transport that allows the use of DM1 packets. In this regard, a master Bluetooth radio may control the operations of a slave Bluetooth radio in a remote device via DM1 packets.

The processor 206 may comprise suitable logic, circuitry, and/or code that may enable controlling at least a portion of the operations in the WLAN/Bluetooth coexistence terminal 200. The processor 206 may also enable processing of WLAN and/or Bluetooth data, for example. The processor 206 may be utilized to select a user model for the operation of the WLAN/Bluetooth coexistence terminal 200. In this regard, when the user model corresponds to a high QoS or low latency applications and/or high bandwidth traffic, such as for interactive console applications, the processor 206 may control at least a portion of the operations of the WLAN radio 202 and/or the Bluetooth radio 204. For example, when the isolation value between the front-ends of the WLAN radio 202 and the Bluetooth radio 204 fall below a certain threshold level for a particular user model, the processor 206 may generate at least one control signal to be communicated to the WLAN radio 202 and/or to the Bluetooth radio 204 to modify at least a portion of the WLAN and/or Bluetooth communication.

The memory 208 may comprise suitable logic, circuitry, and/or code that may enable storage of data for WLAN protocol packet processing, Bluetooth protocol packet processing, and/or for general control and/or data processing operations by the processor 206. In this regard, the memory 208 may communicate with the processor 206, the WLAN radio 202, and/or the Bluetooth radio 204 via the bus 210.

Figure 2B:
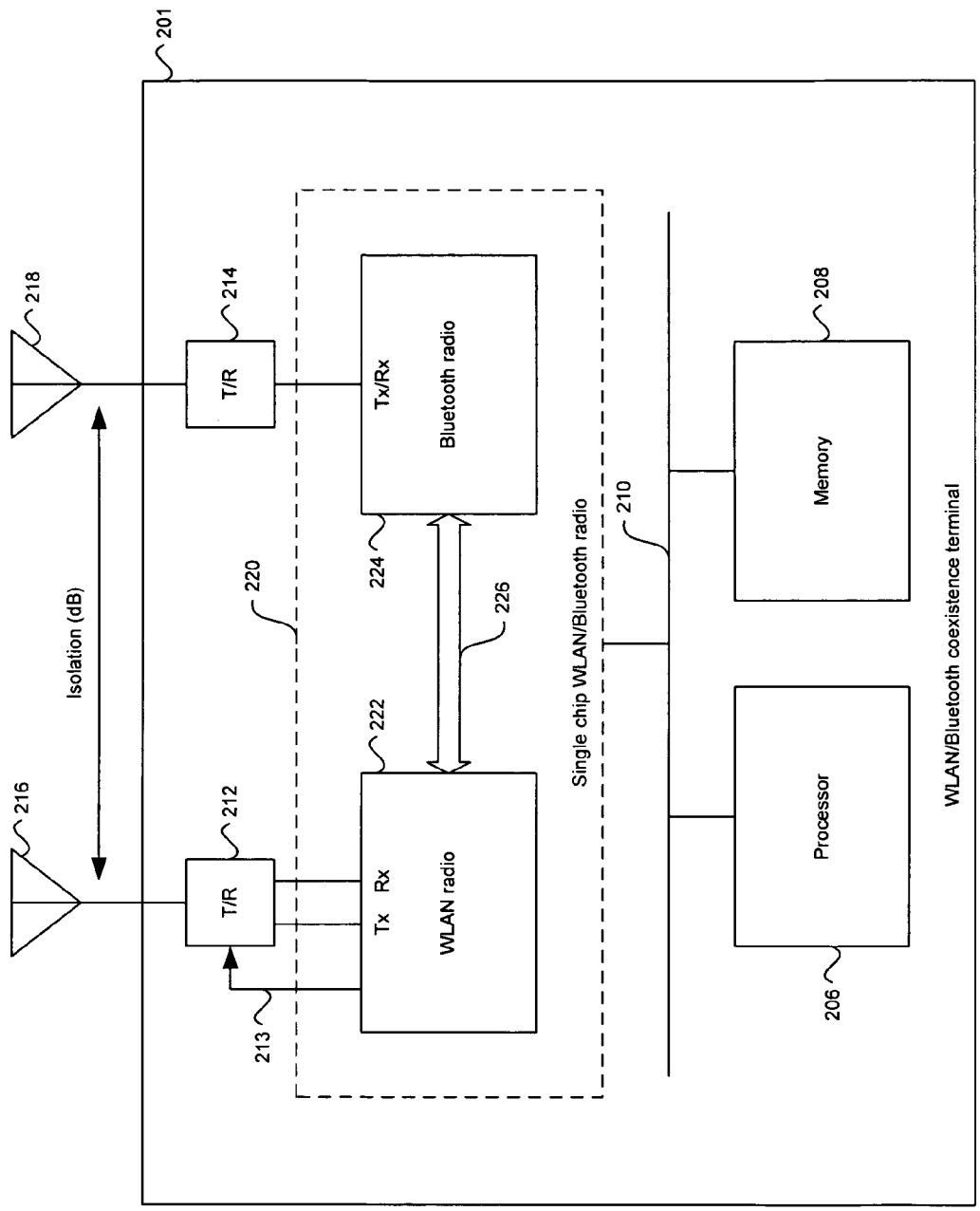
FIG. 2B is a block diagram illustrating an exemplary WLAN/Bluetooth coexistence terminal with a single integrated circuitry (IC) that supports WLAN and Bluetooth radio operations, in accordance with an embodiment of the invention.

FIG. 2B is a block diagram illustrating an exemplary WLAN/Bluetooth coexistence terminal with a single integrated circuitry (IC) that supports WLAN and Bluetooth radio operations, in accordance with an embodiment of the invention. Referring to FIG. 2B, there is shown the WLAN/Bluetooth coexistence terminal 201 that may differ from the WLAN/Bluetooth coexistence terminal 200 in FIG. 2A in that a single chip WLAN/Bluetooth radio 220 may be utilized. The single chip WLAN/Bluetooth radio 220 may be implemented based on a system-on-chip (SOC) architecture, for example.

The single chip WLAN/Bluetooth radio 220 may integrate a WLAN radio 222 and a Bluetooth radio 224. The WLAN radio 222 may be the same or substantially similar to the WLAN radio 202 in FIG. 2A. The Bluetooth radio 224 may be the same or substantially similar to the Bluetooth radio 204 in FIG. 2A. The signal bus 226 may correspond to the signal bus 211 in FIG. 2A. The signal bus 226 may comprise a larger number of signals than may be implemented by the signal bus 211 since the signal bus 226 is an integrated bus and there is no need for available input/output pins for each radio. In this regard, the signal bus 226 may be utilized to communicate information between the WLAN radio 222 and the Bluetooth radio 224 in addition to the priority signals TX_WLAN and TX_BT, for example.

Figure 3:
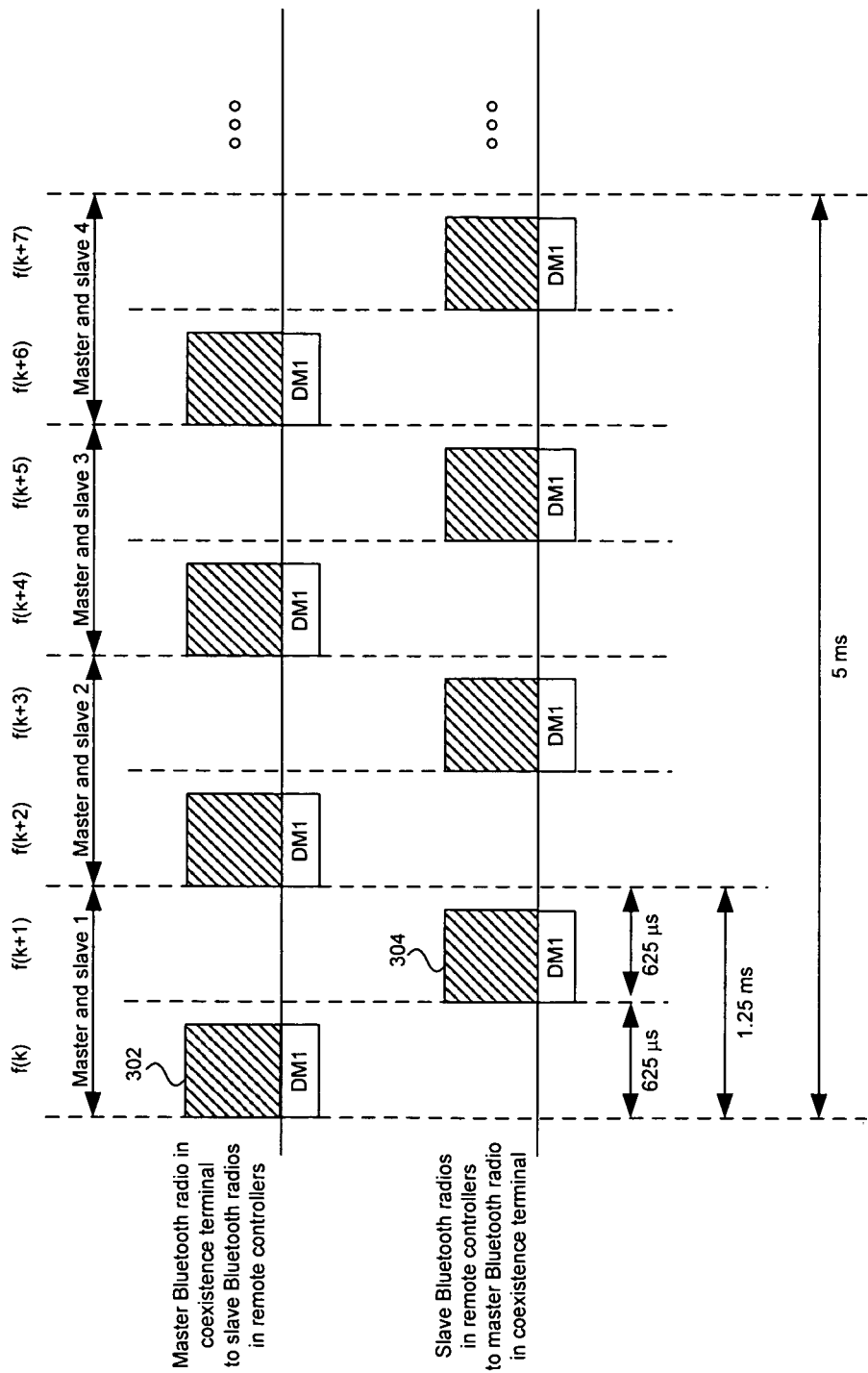
FIG. 3 is a timing diagram illustrating communication between the master Bluetooth radio in a WLAN/Bluetooth coexistence terminal and slave Bluetooth radios in remote controllers, in accordance with an embodiment of the invention.

FIG. 3 is a timing diagram illustrating communication between the master Bluetooth radio in a WLAN/Bluetooth coexistence terminal and slave Bluetooth radios in remote controllers, in accordance with an embodiment of the invention. Referring to FIG. 3, there is shown an exemplary timing representation of DM1 communication from a coexistence terminal, such as the WLAN/Bluetooth coexistence terminals 200 and 201 described in FIGS. 2A and 2B respectively, to remote devices, such as the remote controllers 114d in FIG. 1C. In the exemplary embodiment described in FIG. 3, the Bluetooth radio in the coexistence terminal may operate as a master Bluetooth radio that may communicate DM1 packets with slave Bluetooth radios in four remote controllers. The communication described in FIG. 3 corresponds to a user model where high QoS or low latency applications and/or high bandwidth traffic occurs. In this regard, the coexistence terminal may have a 5 ms window to communicate with all four remote controllers and may not be able to provide time-multiplexed packet arbitration techniques during this period.

The transmission of a pair of DM1 packets between a coexistence terminal and a remote controller is referred to as a frame. A packet 302 may be transmitted from the master Bluetooth radio in the coexistence terminal to the slave Bluetooth radio in a first remote controller in time slot f(k) and a packet 304 may be transmitted from the first remote controller to the coexistence terminal in time slot f(k+1). A time slot in Bluetooth communication is 625 μs in duration and each time slot may correspond to a different frequency in an adaptive frequency hopping (AFH) hopping sequence. A Bluetooth frame may be 1.25 ms in duration. Similarly, DM1 packets may be transmitted from the coexistence terminal to a second remote controller, a third remote controller, and to a fourth remote controller in time slots f(k+2), f(k+4), and f(k+6) respectively. Moreover, DM1 packets may be transmitted from the second remote controller, the third remote controller, and the fourth remote controller to the coexistence terminal in time slots f(k+3), f(k+5), and f(k+7) respectively.

The coexistence terminal may communicate control information and/or data to any of the remote controllers via the DM1 packets transmitted in time slots f(k), f(k+2), f(k+4), and f(k+6). In this regard, the coexistence terminal may communicate control information that may be utilized to modify the transmission power of any of the remote controllers to control the signal-to-noise-plus-interference ratio (SINR) at the coexistence terminal in order to reduce or eliminate desensitization effects that may result from signal interference. For example, when the isolation value between the master Bluetooth and WLAN radio front-ends in a WLAN/Bluetooth coexistence terminal falls below a threshold value, the master Bluetooth radio may generate at least one control signal, such as a link manager PDU transmitted via a DM1 packet, to increase a remote controller's transmission power. The remote controllers may also communicate control information and/or data to the coexistence terminal via the DM1 packets transmitted in time slots f(k+1), f(k+3), f(k+5), and f(k+7).

Figure 4:
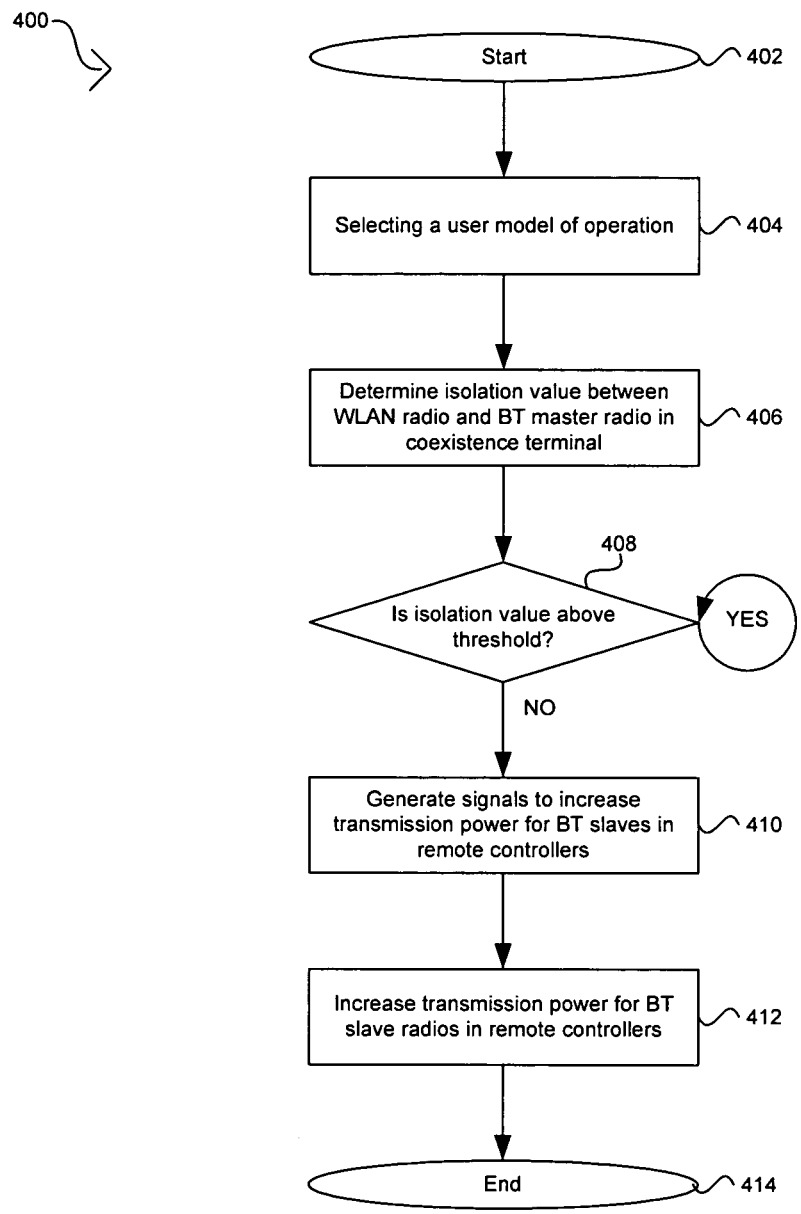
FIG. 4 is a flow diagram that illustrates exemplary steps for modifying transmission power in remote controllers for low radio isolation in a WLAN/Bluetooth coexistence terminal, in accordance with an embodiment of the invention.

FIG. 4 is a flow diagram that illustrates exemplary steps for modifying transmission power in remote controllers for low radio isolation in a WLAN/Bluetooth coexistence terminal, in accordance with an embodiment of the invention. Referring to FIG. 4, there is shown a flow diagram 400. After start step 402, in step 404, a WLAN/Bluetooth coexistence terminal, such as the WLAN/Bluetooth coexistence terminals 200 and 201, may select an operating user model. In some instances, the user model may be pre-selected based on system and/or operational requirements, for example. In this regard, the WLAN/Bluetooth coexistence terminal may select or utilize a user model that supports high QoS or low latency applications and/or high bandwidth traffic, for example. In step 406, the WLAN/Bluetooth coexistence terminal may determine the isolation value between the WLAN and master Bluetooth radios. A processor, such as the processor 206, may determine the isolation value, for example.

In step 408, the WLAN/Bluetooth coexistence terminal may determine whether the isolation value falls below a specified threshold level for the current user model. In this regard, the threshold level may be stored in a storage device, such as the memory 208. When the isolation value between radios is at or above the threshold level, signal interference may not cause significant desensitization and the WLAN/Bluetooth coexistence terminal may continue to operate utilizing its current transmission and/or reception settings. The isolation value for certain WLAN/Bluetooth coexistence terminals utilized as interactive gaming consoles may be approximately 27 dB, for example. When the isolation value is below the threshold level, signal interference may cause significant desensitization and the WLAN/Bluetooth coexistence terminal may proceed to step 410.

In step 410, in order to reduce or eliminate interference effects, the master Bluetooth radio in the WLAN/Bluetooth coexistence terminal may generate signals, such as link manager PDUs, for example, to be transmitted via DM1 packets to the slave Bluetooth radios in the remote controllers to increase the power of transmissions to the coexistence terminal. In step 412, the remote controllers may increase the transmission power to the coexistence terminal. Increasing the power of signals received by the coexistence terminal may result in higher SINR and the desensitization that results from interference effects may be reduced or eliminated. After step 412, the process may proceed to end step 414.

After receiving control information to increase transmission power, the slave Bluetooth radios in the remote controllers may also generate signals, such as link manager PDUs, for example, to be transmitted via DM1 packets to the master Bluetooth radio in the coexistence terminal to increase its transmission power in response to their power transmission increase. In this regard, the master Bluetooth radio may set a limit on the maximum transmission power that it may utilize.

Figure 5:
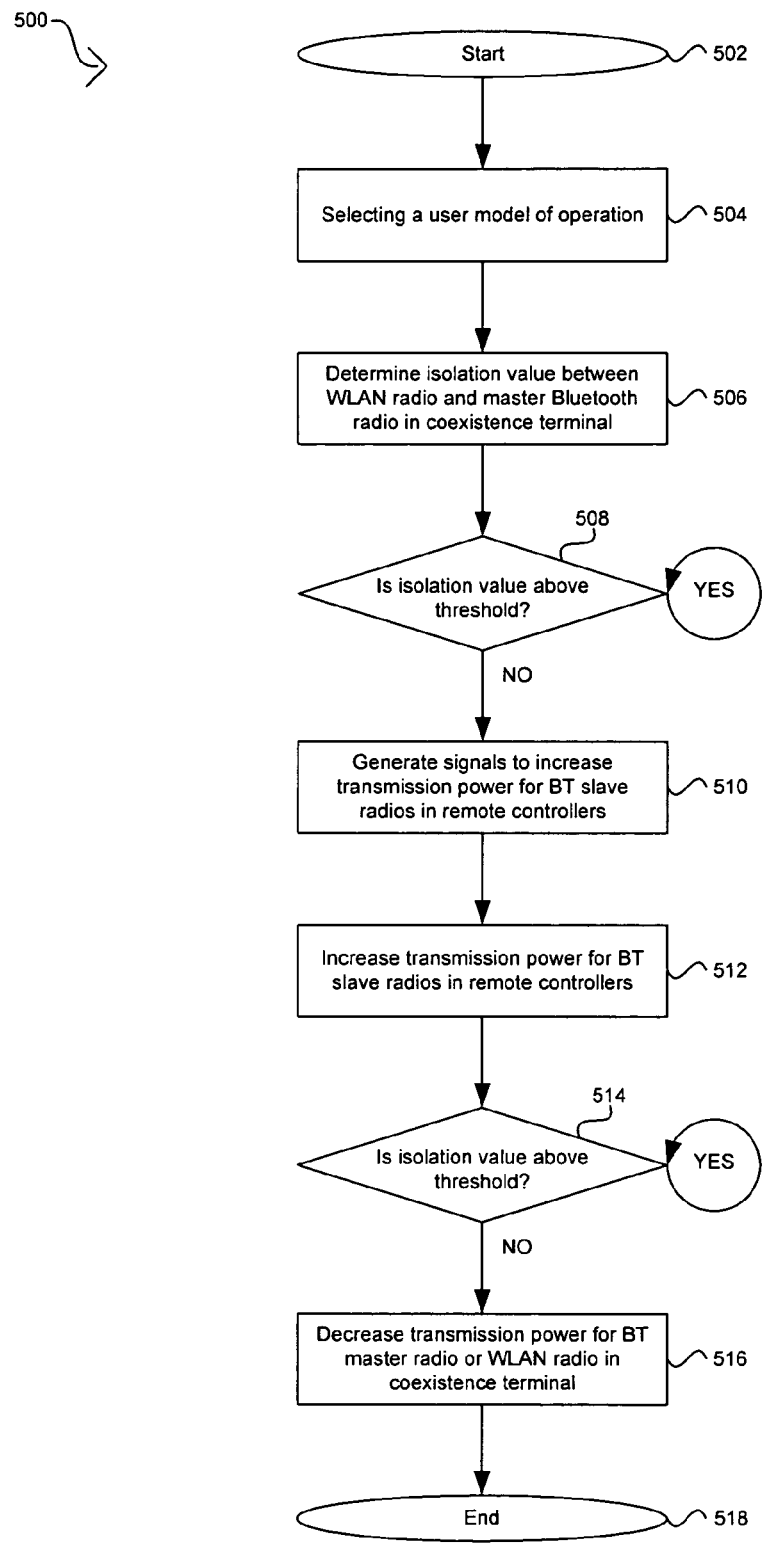
FIG. 5 is a flow diagram that illustrates exemplary steps for modifying transmission power in remote controllers and in a WLAN/Bluetooth coexistent terminal for low radio isolation in the WLAN/BT coexistence terminal, in accordance with an embodiment of the invention.

FIG. 5 is a flow diagram that illustrates exemplary steps for modifying transmission power in remote controllers and in a WLAN/Bluetooth coexistent terminal for low radio isolation in the WLAN/BT coexistence terminal, in accordance with an embodiment of the invention. Referring to FIG. 5, there is shown a flow diagram 500 where steps 502 through 512 may be the same as or substantially similar to steps 402 through 412 in FIG. 4. After step 512, in step 514, the WLAN/Bluetooth coexistence terminal may determine whether the isolation value has fallen below the specified threshold level for the current user model after the increase in transmission power by the remote controllers. When the isolation value between radios has increased to or above the threshold level, signal interference may not cause significant desensitization and the WLAN/Bluetooth coexistence terminal may continue to operate utilizing its current transmission and/or reception settings. When the isolation value has remained below the threshold level, signal interference may continue to cause significant desensitization and the WLAN/Bluetooth coexistence terminal may proceed to step 516. In step 516, the WLAN/Bluetooth coexistence terminal may decrease the transmission power of the master Bluetooth radio and/or the WLAN radio to reduce or eliminate the desensitization effects of signal interference. Lowering the transmission power of the coexistence terminal radios may result in a further increase in the isolation value as the signal interference effects may be reduced. After step 516, the process may proceed to end step 518.

Regarding decreasing or lowering the transmission power of the WLAN radio, this approach may be applicable when the WLAN/Bluetooth coexistence terminal is located sufficiently close to an access point (AP) or to another WLAN station to avoid the hidden node issue that results when distant WLAN stations or AP nodes may be unaware of the WLNA/Bluetooth coexistence terminal presence.

The approached described herein may also be utilized in terminals where any two unsynchronized wireless networks are in coexistent operation in the same frequency band and the radios for each of the wireless networks are in close proximity to each other.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing wireless communication, the method comprising:
   generating within a coexistence terminal comprising a WLAN radio and a Bluetooth radio, a signal that causes the Bluetooth radio of said coexistence terminal and a remote Bluetooth radio to each adjust a respective transmit power when communicating with each other based on a measured isolation between the WLAN radio of said coexistence terminal and the Bluetooth radio of said coexistence terminal; and
   communicating the signal to the Bluetooth radio of said coexistence terminal and to said remote Bluetooth radio.

2. The method according to claim 1, comprising configuring the Bluetooth radio of said coexistence terminal to operate as a master Bluetooth device and wherein said remote Bluetooth radio is configured as a slave Bluetooth device.

3. The method according to claim 1, wherein said generated signal causes said remote Bluetooth radio to increase its transmit power when said measured isolation is less than an isolation threshold.

4. The method according to claim 1, wherein said generated signal causes said remote Bluetooth radio to decrease its transmit power when said measured isolation is greater than or equal to an isolation threshold.

5. The method according to claim 1, wherein said generated signal causes the Bluetooth radio of said coexistence terminal to decrease its transmit power when said measured isolation is less than an isolation threshold.

6. The method according to claim 1, wherein said generated signal causes the Bluetooth radio of said coexistence terminal to increase its transmit power when said measured isolation is greater than or equal to an isolation threshold.

7. The method according to claim 1, wherein said generated signal causes the WLAN radio of said coexistence terminal to decrease its transmit power when said measured isolation is less than an isolation threshold.

8. The method according to claim 1, wherein said generated signal causes the WLAN radio of said coexistence terminal to increase its transmit power when said measured isolation is greater than or equal to an isolation threshold.

9. The method according to claim 1, wherein said signal is a link manager protocol (LMP) signal.

10. A system for providing wireless communication, the system comprising:
    a coexistence terminal comprising a WLAN radio and a Bluetooth radio,
    wherein said coexistence terminal is operable to generate a signal that causes the Bluetooth radio of said coexistence terminal and a remote Bluetooth radio to each adjust operation of a WLAN radio and a Bluetooth radio when communicating with each other based on a measurable value of isolation between the WLAN radio of said coexistence terminal and the Bluetooth radio of said coexistence terminal,
    wherein said coexistence terminal is operable to communicate the signal to the Bluetooth radio of said coexistence terminal and to said remote Bluetooth radio.

11. The system according to claim 10, wherein said coexistence terminal is further operable to set up the Bluetooth radio of said coexistence terminal to operate as a master Bluetooth device and wherein said remote Bluetooth radio is configured as a slave Bluetooth device.

12. The system according to claim 10, wherein said generated signal causes said remote Bluetooth radio to increase its transmit power when said measurable value of is less than an isolation threshold.

13. The system according to claim 10, wherein said generated signal causes said remote Bluetooth radio to decrease its transmit power when said measurable value of isolation is greater than or equal to an isolation threshold.

14. The system according to claim 10, wherein said generated signal causes the Bluetooth radio of said coexistence terminal to decrease its transmit power when said measurable value of isolation is less than an isolation threshold.

15. The system according to claim 10, wherein said generated signal causes the Bluetooth radio of said coexistence terminal to increase its transmit power when said measurable value of isolation is greater than or equal to an isolation threshold.

16. The system according to claim 10, wherein said generated signal causes the WLAN radio of said coexistence terminal to decrease its transmit power when said measurable value of isolation is less than an isolation threshold.

17. The system according to claim 10, wherein said generated causes the WLAN radio of said coexistence terminal to increase its transmit power when said measurable value of isolation is greater than or equal to an isolation threshold.

18. The system according to claim 10, wherein said signal is a link manager protocol (LMP) signal.

19. A system, comprising:
    a remote device comprising a Bluetooth radio; and
    a coexistence terminal comprising a WLAN radio and a Bluetooth radio;
    wherein the coexistence terminal is configured to:
        determine a value of isolation between the WLAN radio and the Bluetooth radio of the coexistence terminal;
        determine whether the value of isolation is below a threshold;
        in response to the determination that the value of isolation is below the threshold, increase a first transmission power of the Bluetooth radio of the coexistence terminal and generate a signal causing the remote device to increase a second transmission power of the Bluetooth radio of the remote device, the increase of the second transmission power being relative to transmission during communication with the coexistence terminal; and
        communicate the signal to the Bluetooth radio of the coexistence terminal and to the Bluetooth radio of the remote device.

20. The system according to claim 19, wherein the coexistence terminal is further configured to set up the Bluetooth radio of the coexistence terminal to operate as a master Bluetooth device, and wherein the Bluetooth radio of the remote device is set up to operate as a slave Bluetooth device.

21. The system according to claim 19, wherein the signal is a link manager protocol (LMP) signal.

\* \* \* \* \*